US010824620B2

(12) United States Patent
Menzies-Smith

(10) Patent No.: US 10,824,620 B2
(45) Date of Patent: Nov. 3, 2020

(54) COMPILING A RELATIONAL DATASTORE QUERY FROM A USER INPUT

(71) Applicant: salesforce.com, inc., San Francisco, CA (US)

(72) Inventor: Jonathan Menzies-Smith, London (GB)

(73) Assignee: SALESFORCE.COM, INC., San Francisco, CA (US)

( * ) Notice: Subject to any disclaimer, the term of this patent is extended or adjusted under 35 U.S.C. 154(b) by 741 days.

(21) Appl. No.: 15/331,532

(22) Filed: Oct. 21, 2016

(65) Prior Publication Data

US 2018/0113901 A1    Apr. 26, 2018

(51) Int. Cl.
G06F 16/00     (2019.01)
G06F 16/242    (2019.01)
G06F 16/2453   (2019.01)
G06F 16/2455   (2019.01)

(52) U.S. Cl.
CPC ...... *G06F 16/2423* (2019.01); *G06F 16/2456* (2019.01); *G06F 16/24535* (2019.01)

(58) Field of Classification Search
CPC .... G06F 16/24; G06F 16/242; G06F 16/2423; G06F 16/24534; G06F 16/24535; G06F 16/2456
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |

(Continued)

*Primary Examiner* — Diedra McQuitery
(74) *Attorney, Agent, or Firm* — Schwabe Williamson & Wyatt

(57) ABSTRACT

In an example, a database system may be configured to receive configuration data including a mapping of objects of a relational database to query generation parameters; compare values in a received first query to the mapping to identify column definition data of the query generation parameters; ascertain whether to identify table definition data of the configuration data based on the column definition data; determine whether to create one or more subqueries for one or more tables based on the table definition data; in response to determining to create the one or more subqueries, join a table of the one or more tables to a root table based on table relationship data of the configuration data; and build a second relational datastore query using the one or more subqueries.

20 Claims, 9 Drawing Sheets

(56) References Cited

U.S. PATENT DOCUMENTS

| | | |
|---|---|---|
| 6,233,617 B1 | 5/2001 | Rothweln et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,918,388 B1 * | 12/2014 | Chen ............... G06F 16/283 707/714 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0020580 A1 * | 1/2006 | Dettinger ............... G06F 16/284 |
| 2006/0020582 A1 * | 1/2006 | Dettinger ............... G06F 16/248 |
| 2008/0089495 A1 * | 4/2008 | MacLellan ............ G06F 16/248 379/93.25 |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2011/0218958 A1 | 9/2011 | Warshavsky |
| 2011/0247051 A1 | 10/2011 | Bulumulla |
| 2011/0282864 A1* | 11/2011 | Collins ............. G06F 16/24534 707/719 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2016/0154840 A1* | 6/2016 | Cazemier ............. G06F 16/215 707/692 |

\* cited by examiner

```
{                                           501
  "selectedColumns": [
    {
      "columnId": 1517
    },
    {
      "columnId": 1010
    }
  ],
  "groupByColumn": {
    "columnId": 101
  },
  "dateStart": null,
  "dateEnd": null,
  "dateRangeType": 0,
  "temporalAggregation": "Total",
  "TextFilter": "find me",
  "TextFilterColumns": {
    "columnId": 1010
  },
  "filters": [
    {
      "columnId": 1517,
      "values": [
        "1",
        "6"
      ],
      "exclude": false,
      "mode": "Equal"
    }
  ],
  "summarizeByColumn": {
    "columnId": 1003
  },
  "sortByColumn": {
    "columnId": 1003
  },
  "sortDescending": false,
  "pageSize": 100,
  "pageIndex": 0,
  "getCount": true,
  "excludeRecordsWithNoStats": false,
  "debugMode": true
}
```

FIGURE 5A

```
"Data": [                    502
  {                         /
    "Values": [
      {
        "ColumnId": 116,
        "Value": "sx2vnh",
        "Name": "Account ID"
      },
      {
        "ColumnId": 1013,
        "Name": "Ad Bid Type"
      },
      {
        "ColumnId": 103,
        "Name": "Ad ID"
      }
    ]
  },
  {
    "Values": [
      {
        "ColumnId": 116,
        "Value": "sx2vnh",
        "Name": "Account ID"
      },
      {
        "ColumnId": 1013,
        "Name": "Ad Bid Type"
      },
      {
        "ColumnId": 103,
        "Name": "Ad ID"
      }
    ]
  },
```

*FIGURE 5B*

COMPILING A RELATIONAL DATASTORE QUERY FROM A USER INPUT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to databases, and some embodiments related to compiling a relational database query from a user input.

DESCRIPTION OF THE RELATED ART

SQL (structured query language) is a programming language to manage data of a relational database. Relational databases may include one or more tables populated with data, for instance more than one table populated with data. Known schemes for generating certain types of SQL queries, particularly those involving more than one table of a database, may take days or weeks with a large amount of technical effort.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 5A-B illustrate, respectively, an example of a user input and a generated relational datastore query generated based on the user input.

DETAILED DESCRIPTION

Figure 1A:
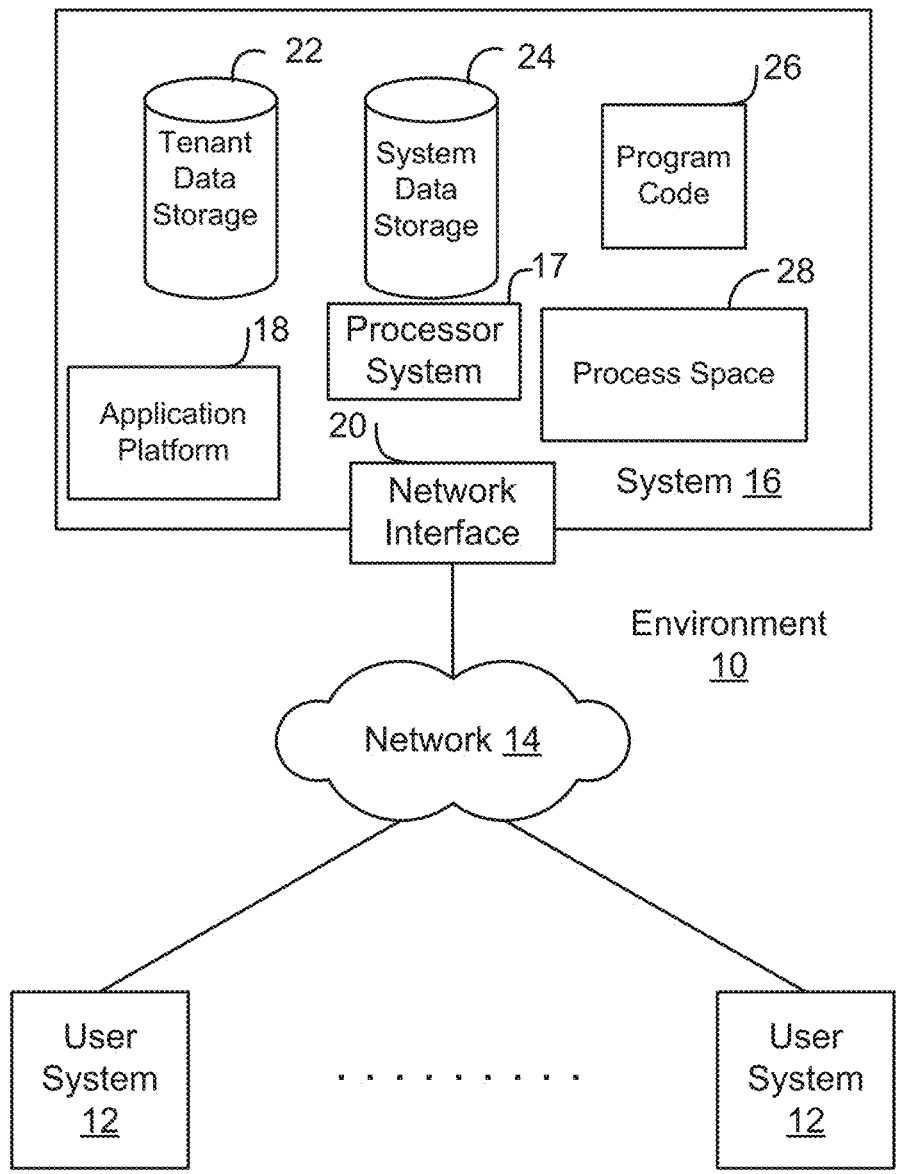
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for compiling a relational datastore query from a user input.

In some examples, a dynamic relational database generator is provided (e.g., a dynamic SQL generator). The dynamic relational database generator may be usable, for instance, to select a flattened view of data across multiple tables in a relational database.

In some examples, a system including the dynamic relational database generator may be configured to generate and execute relational database programming language based on a query model (e.g., a standardized query model) and return results in a generic format. The dynamic relational database generator may be configured to automatically aggregate data across tables including one to many relationships based on defined table relationships. The dynamic relational database generator may be configured to filter data based on more than one column condition. The dynamic relational database generator may be configured to sort and paginate the aggregated data. The dynamic relational database generator may be configured to calculate columns based on formulas and support filtering and sorting on these calculated columns. The dynamic relational database generator may be configured to generate relational database language queries that only select the requested columns.

A system including the dynamic relational database generator may be used for a wide variety of applications such as displaying and searching through large datasets in a table/grid view, generating downloadable reports/spreadsheets, displaying timeseries charts, building analytics dashboards, and the like, or combinations thereof.

In an example, a database system may be configured to receive configuration data including a mapping of objects of a relational database to query generation parameters; compare values in a received first query to the mapping to identify column definition data of the query generation parameters; ascertain whether to identify table definition data of the configuration data based on the column definition data; determine whether to create one or more subqueries for one or more tables based on the table definition data; in response to determining to create the one or more subqueries, join a table of the one or more tables to a root table based on table relationship data of the configuration data; and build a second relational datastore query using the one or more subqueries.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as teed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
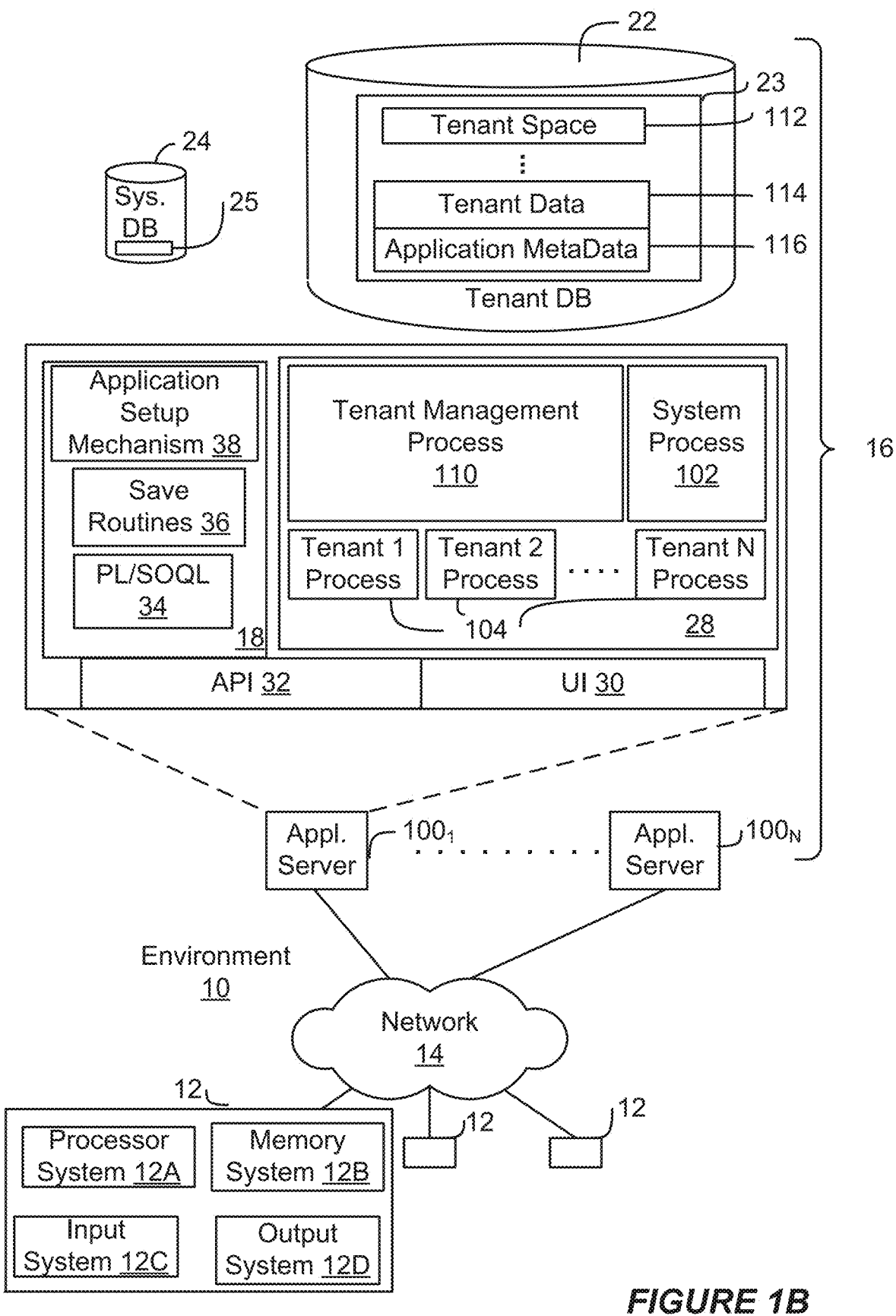
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Compiling a Relational Database from a User Input

Figure 2:
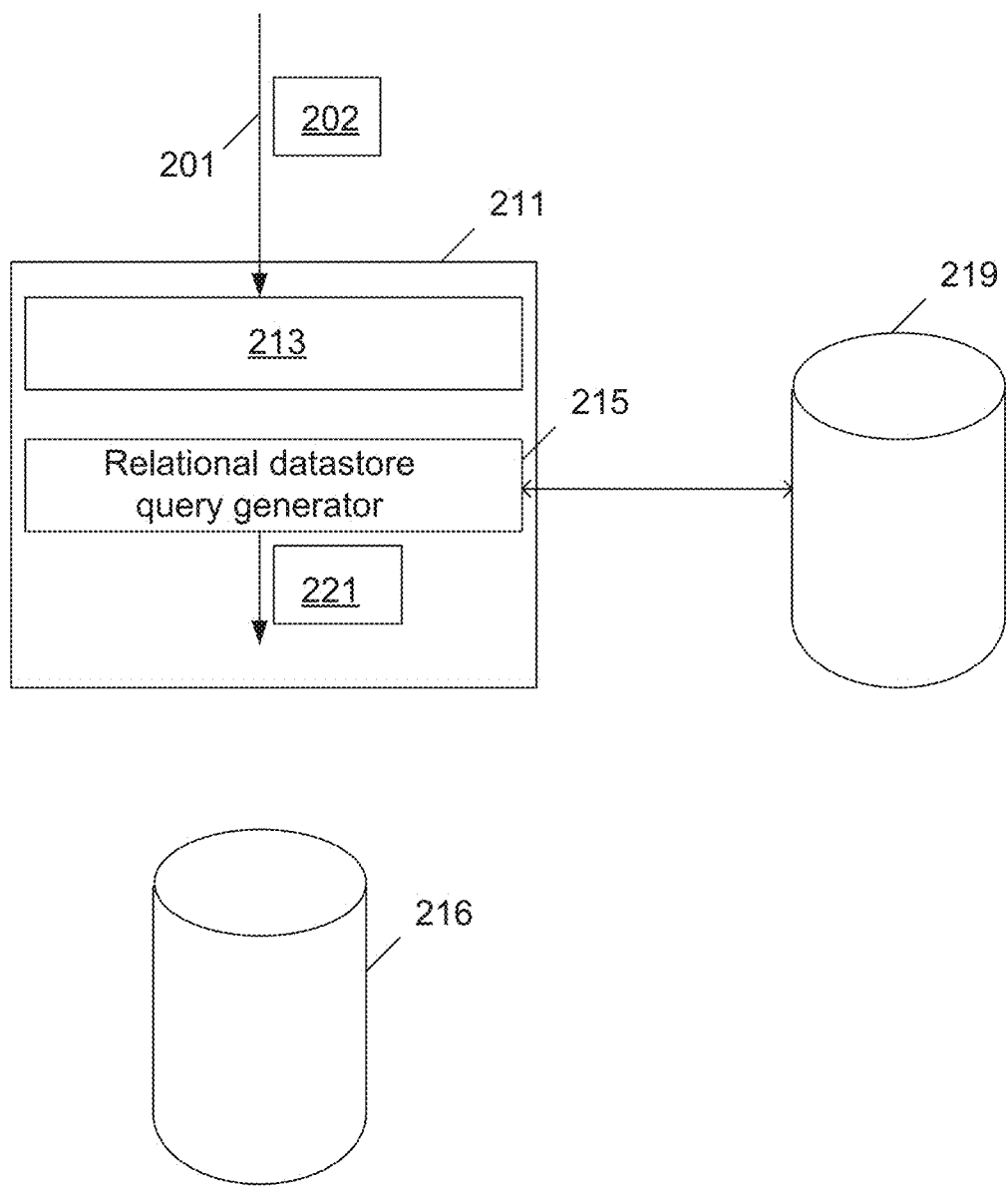
FIG. 2 illustrates a system for compiling a relational datastore query from a received user input.

FIG. 2 illustrates a system 200 for compiling a relational datastore query 221 based on a received user input 201. The system 200 may include a user interface component 213, e.g., a REST (REpresentational State Transfer) API (Application Programming Interface), that enables a user to identify instructions 202 (e.g., by making graphical user interface selections and/or by entering text commands to select data from a relational datastore 216).

The system 200 may also include configuration data 219 and a relational datastore query generator 215 to identify a portion of the configuration data 219 based on the instructions 202. In one example, the configuration data 219 may include a mapping to associate objects of the relational datastore 216, e.g., columns, to query generation parameters, such as column definitions.

The relational datastore query generator 215 may use the query definition parameters and other information of configuration data 219 to determine whether the instructions 202 involve a first root table including a single record that corresponds to more than one record of a second table (e.g., a many to one relationship). In the event that the instructions 202 involve tables related by a many to one relationship, the relational datastore query generator 215 may generate one or more subqueries so that a subquery is created for each table of more than one record. The relational datastore query generator 215 may generate relational datastore query 221 (e.g., a single query), which may be submitted to component (not shown) associated with the relational datastore 216 in order to obtain a query result.

The system 200 may enable a user who is not familiar with, say, SQL (or some other programming language associated with a relational database) to operate the user interface 213 (e.g., make selections from graphical user interface components and/or enter instructions into a text interface component) that can be input into the relational datastore query generator 215 to automatically generate a SQL query (or other relational database query). The configuration data 219 may be set up once by any user (say a different user, such as an administrator), and may be used for queries to the tables of the datastore 216. In other examples, the user may be an expert in SQL (or some other programming language associated with a relational database), and could be the same user that inputs the configuration data 219. However, a time for making selections from the user interface 213 combined with a time of the automatic generation based on the selections may be less than the time needed for that expert to manually create the SQL query (or some other programming language associated with a relational database).

Furthermore, the system 200 may be used to produce SQL queries that "flatten" data stored in more than one row (e.g., record) to generate a single row having the flatted data. For instance, the user input may include an aggregation method for aggregating data of the more than one row. The single row may be used to drive any visualizations, such as a display table (that includes the single row having the aggregated data), a graph, a spreadsheet, or the like, or combinations thereof.

To illustrate by way of an example, consider a relational datastore including advertising data records. The relational datastore may include first a root table "advertising campaign" that includes a single row defining a combination of advertisements. The second table may include a row for each advertisement. The first root table may include a campaign name, as a column, and the second table may include budget as a column. A user may desire to generate a query result including a single row with campaign name and budget for all of the advertisements in that campaign (e.g., "flattened" data).

In this scenario, the instruction to select the data from the relational database (which may be referred to herein as a "select instruction") may include two selected columns—one being campaign name (it comes from the campaign table and it uses the campaign name field), the other being advertisement budget (it comes from the advertisement table and it uses the budget field).

The system 200 may recognize both columns, and based on the configuration data, also recognize that both tables are to be involved in the query to be generated. The system 200 may, based on the configuration data, recognize a one to many relationship involved in the query generation and generate the appropriate query.

The user interface component 213 may be downloaded all or in part to the user system 12 of FIG. 1 and may execute all or in part of the user system 12. In some examples, the relational datastore query generator 215 may reside in the database system 16 (e.g., on an application server of the database system 16). In such cases the relational datastore query generator 215 may receive the instruction 202 over a network from the user system 12. In other examples, the relational datastore query generator 215 may reside all or in part on the user system 12. The datastore 216 may be part of tenant DB 22 in one example (although this is not required), and the configuration data 219 may be stored in a location accessible to the relational datastore query generator 215, e.g., on the system DB 24 in some examples (although this is not required).

Figure 3A:
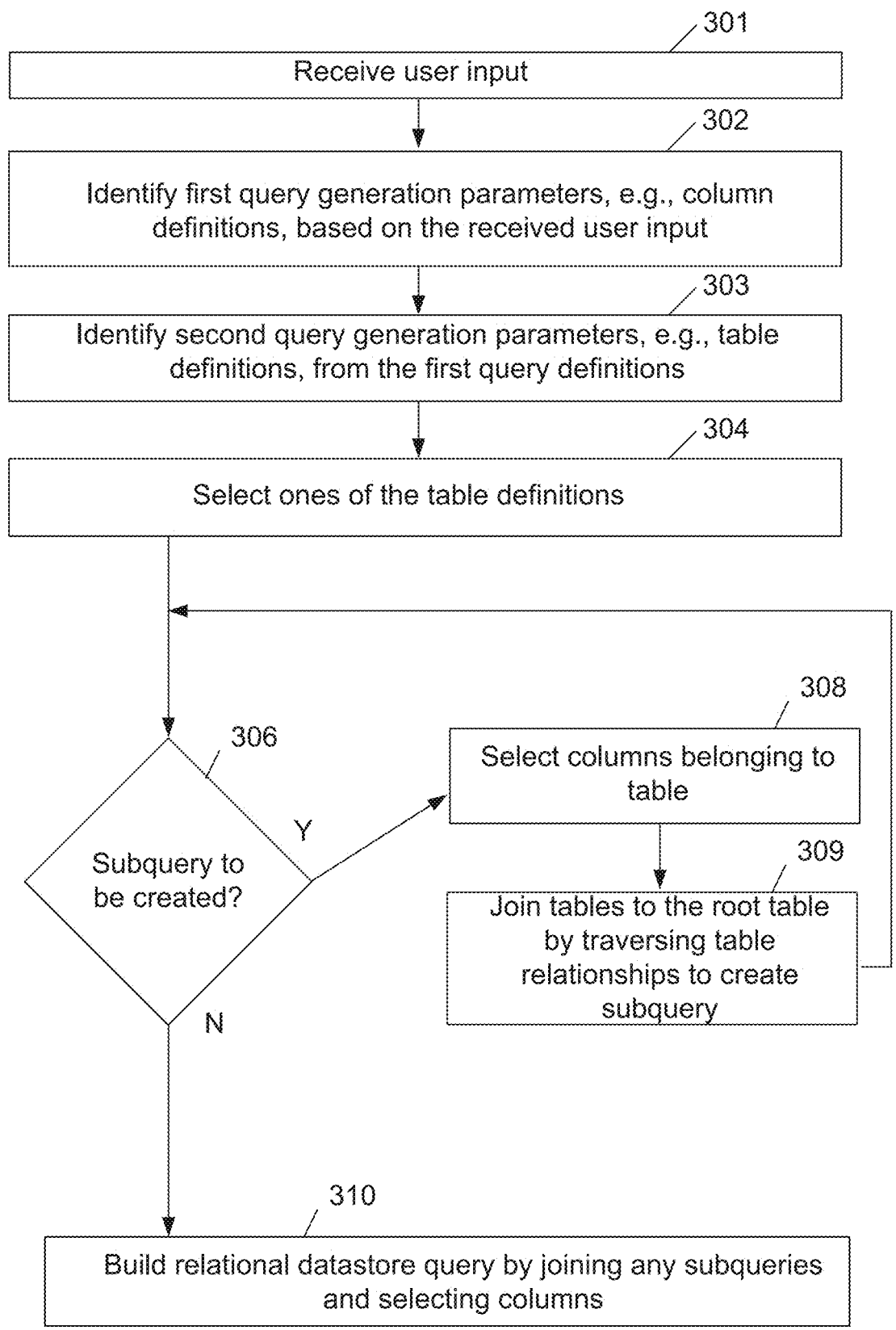
FIG. 3A illustrates a process that may be performed by the system of FIG. 2, in some embodiments.

FIG. 3A illustrates a process that may be performed by the system of FIG. 2, in some embodiments.

Figure 3B:
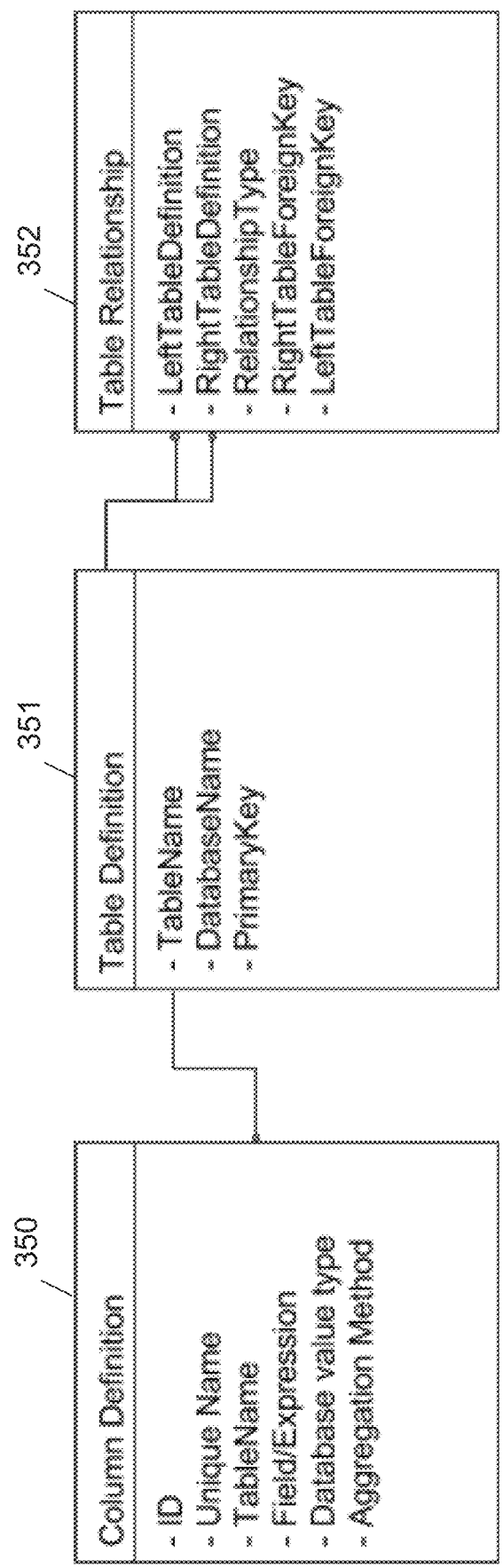
FIG. 3B is a configuration diagram to illustrate configuration data that may be utilized in the process of FIG. 3A.

In block 301, the relational datastore generator 215 may receive an instruction to select data from a relational datastore. In block 302, the relational datastore generator 215 may identify first query generation parameters based on the received user input. Referring to FIG. 3B, which is a configuration diagram to illustrate information of the configuration data 219 of FIG. 2A in one example, the configuration data may include a mapping of objects of the relational database to query generation parameters. The relational datastore generator 215 may compare objects identified in the user input (e.g., columns) to the mapping to identify the column definitions 350. In an example, the user input may include a calculated column that references more than one column, which may result in the relational datastore generator 215 identifying more than one of the column definitions 350.

Referring again to FIG. 3A, in block 303 the relational datastore generator 215 may identify second query generation parameters from the first query generation parameters. Referring to FIG. 3B, the second query generation parameters may include the table definitions 351. The table definitions 351 indicate which tables need to be referenced in the query to be generated.

Referring again to FIG. 3A, in block 304 the relational datastore generator 215 may select one of the table definitions 351. In an example, the relational datastore generator 215 may select ones of the table definitions 351 that include a non-1:1 relationship, e.g., a many to one relationship.

If a subquery (which may be implemented as common table expressions in some examples) is to be created (e.g., at least one table definition 351 having a many to one relationship is selected), then in block 308 the relational datastore generator 215 may select columns belonging to the table. In block 309, the relational datastore generator 215 may join tables to the root table by traversing table relationships 352 (FIG. 3B) to create the subquery. This is in order to expose a field on which to join the subquery to the main query. For example the 'advertisement' table would have a foreign key (AdvertisementCampainId), to the 'advertisement campaign' table. Should an additional table 'advertisement images' exist, then in order to join a subquery of 'advertisement images' to the main 'advertisement campaign' table, the subquery may select the 'AdvertisementCampaignId' field from the 'advertisement' table by joining 'advertising images' to the 'advertisement' table.

The process may repeat blocks 308 and 309 for a next selected table definition 351 until all subqueries are created. The process may be iterative, or performed in parallel (an order in which the subqueries are defined may not matter, in some examples). In block 310, the relational datastore generator 215 builds a relational database query by joining any subqueries and selecting columns. The relational datastore generator 215 or a component (not shown) corresponding to the relational datastore 216 may select columns (e.g., all columns requested in the select instruction) and generate expressions for selected calculated columns, execute the query, and return the result.

In some relational databases, the relationship between the tables (which may or may not be explicitly defined in the database) may correspond to a snowflake schema. Particular tables in the database may be related via a one to many, many to one, or one to one relationship. The tables in the relational database may be related via a shared field (e.g., foreign key). The tables may or may not be configured with a primary key, or a foreign key constraint.

Referring again to FIG. 3B, column definitions 350 may be stored in a datastore table. The column definitions 350 may be coded by a user, e.g., an administrator, system user, or the like. The table definitions 351 may be configured in code along with table relationships 352 in some examples, although in other examples they could be store in a database table.

Figure 4A:
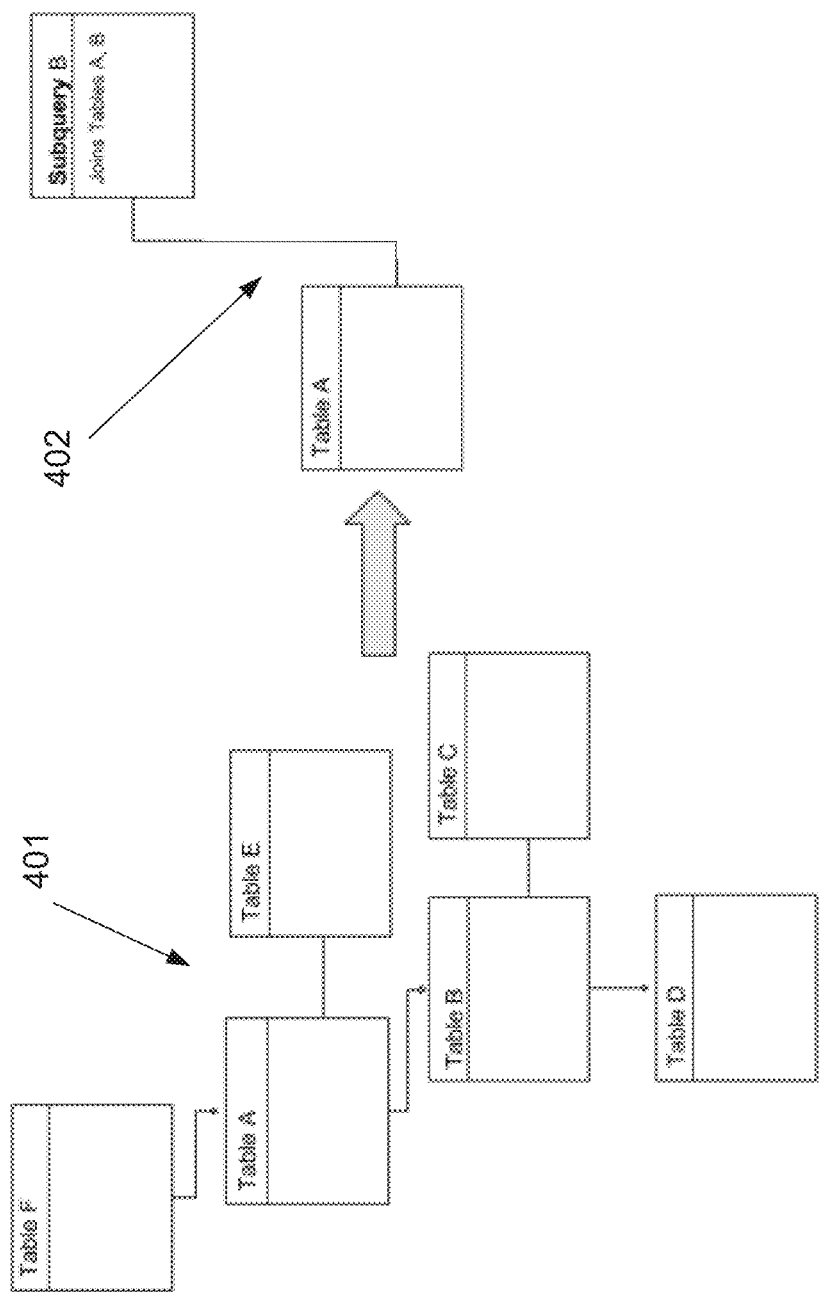
FIG. 4A illustrates an example of a generated query structure using the process of FIG. 3 from a snowflake table schema.

FIG. 4A illustrates an example of a generated query structure 402 using the process of FIG. 3 from a snowflake table schema 401 for the previously discussed case of a user input involving a campaign table and an advertisement table. In FIG. 4A, the campaign may be table A of the snowflake table schema 401, and the advertisement table may be Table B. The relational datastore generator 215 may in block 308 select the columns which belong to the advertisement table and which will be used to create the flattened view of the advertisement table. The relational datastore generator 215 may in block 309, using table relationships 352, traverse from the advertising table up to the campaign table, and join the advertising table to the campaign table. The relational datastore generator 215 may select a key to group by (the ID of the campaign, one of the columns from the campaign table), and the subquery may be created based on this selection.

Figure 4B:
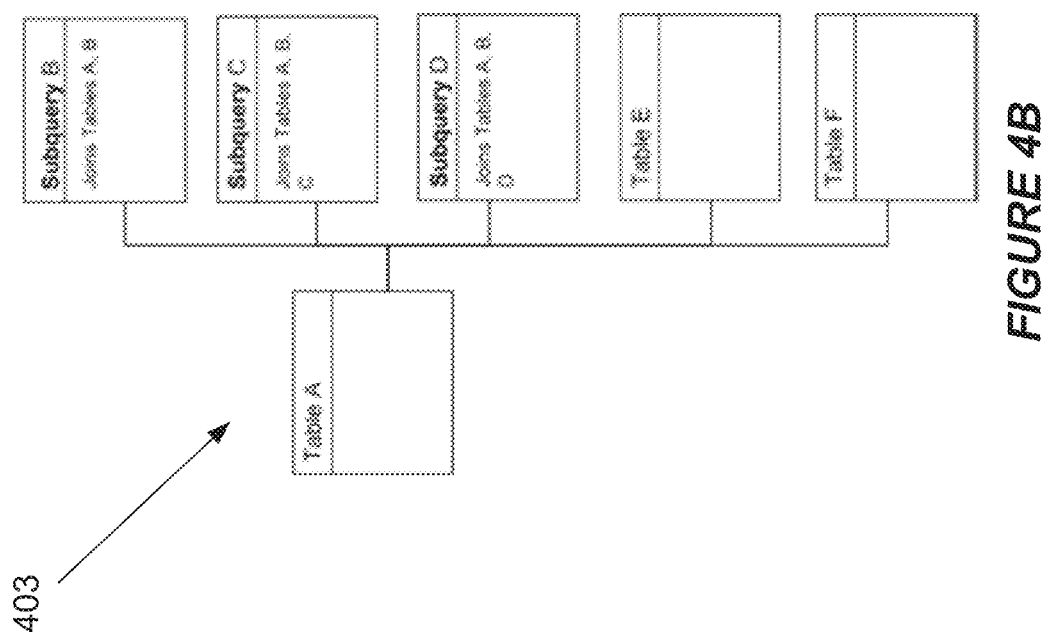
FIG. 4B illustrates a different generated query structure 403 for a user input identifying additional tables.

FIG. 4B illustrates a different generated query structure 403 for a user input identifying additional tables. The generated query structure 403 may be for a select instruction specifying a group by column from table A of snowflake schema 401.

The relational datastore generator 215 may generate a subquery on Table B because there is a one to many relationship from table A to table B. The subquery may use the table relationships (FIG. 3B, 352) to identify which field in Table B relates to Table A and create a join from Table A to Table B. The subquery may group by the column in Table A. The subquery may select all columns the SelectInstruction which appear in Table B.

The relational datastore generator 215 may generate a subquery on Table C because there is a one to many relationship from table A to table B and Table C is joined to Table A via Table B. The subquery may use the table relationships (FIG. 3B, 352) to identify which field in Table C relates to Table B and create a join from table B to table C. The subquery may use the table relationships (FIG. 3B, 352) to identify which field in Table B relates to Table A and create a join from Table A to Table B. The subquery may group by the column in Table A. The subquery may select all columns from the select instructions which appear in Table C. In the previous illustration of campaign/advertisement, the 'advertisement image' table may correspond to Table C, then the subquery for the 'advertisement image' would include Table B and select the AdvertisingCampaignID field from Table B.

The relational datastore generator 215 may generate a subquery for Table D because there is a one to many relationship from table B to table D and from table A to table B. The subquery may use the table relationships (FIG. 3B, 352) to identify which field in Table D relates to Table B and create a join from Table B to Table D. The subquery may use the table relationships (FIG. 3B, 352) to identify which field in Table B relates to Table A, and create a join from Table A to Table B. The subquery may group by the column in Table A. The subquery may select all columns the SelectInstruction which appear in Table D.

The relational datastore generator 215 may generate a query to select from Table A. The relational datastore generator 215 may join Table A to the subquery for Table B. The relational datastore generator 215 may join Table A to the subquery for Table D. The relational datastore generator 215 may join Table A to table E—because there is a one to one relationship. The relational datastore generator 215 may join Table A to table F because there is a many to one relationship. The relational datastore generator 215 may select all columns requested in the select instruction from the respective tables. The relational datastore generator 215 may select all calculated columns requested in the select instruction by expanded nested column references compiling a select expression that can be executed on the database. The relational datastore generator 215 may sort, paginate and filter according to the properties of the select instruction. The relational datastore generator 215 execute the generated query and return the results.

Referring again to FIG. 3B, the column definitions 350, table definitions 351, and table definitions 352 may be for a relational database (such as a data warehouse) The relational database may include one or more tables, e.g., more than one table in a snowflake schema. The tables in the relational database may be related via a shared field (foreign key). The tables in the database may be related via a one to many, many to one or one to one relationship. The tables may or may not be configured with a primary key, or foreign key constraint. The relationship between the tables may or may not be explicitly defined in the relational database.

The tables may have been populated with data. The configuration data may include a mapping, e.g., a table mapping, which may describe the tables which exist in the relational database. The configuration data may include TableRelationships which describes how the tables in the mapping are related.

In one example, the mapping may include table name, database name, and/or primary key. Table relationships 352 may include left mapping, right mapping, relationship type (one to one, one to many, many to one), right table foreign key, left table foreign key (optional if not the same as left table primary key).

Column definitions 350 may describe the database columns available to be selected (in another example, column definitions 350 may describe a formula/expression to calculate a value using one or more database columns.) Column definitions 350 may include ID (identifier), unique name, table name, field name (or expression for calculated columns), database value type (int, decimal, nvarchar, datetime etc . . . ), aggregation method (min, max, sum, average, or the like, or combinations thereof).

The select instruction may define the attributes of the query to be executed. The select instruction may include a list of ColumnDefinition Ids to use for selecting data (select columns). The select instruction may include the ID of a ColumnDefinition to use for sorting (sort by column). The select instruction may include the ID of a ColumnDefinition to use for grouping/aggregating data (group by column). The select instruction may include the ID of a ColumnDefinition to use for a second grouping (e.g., SummarizeByColumn), in some examples. The select instruction may include pagination and filtering parameters.

FIGS. 5A-B illustrate, respectively, an example of a user input (e.g., a select instruction 501) and a generated relational datastore query 502 generated based on the user input. The generated relational datastore query 502 is for an SQL database.

EXAMPLES

One example includes a computerized system for automatically generating a database query to flatten data in a relational schema. The computerized system may include configuration data defining column definitions, table definitions, and table relationships. The computerized system may be configured to identify column definitions of a received select instruction. The system may be configured to identify table definitions from a set of column definitions, e.g., from the identified column definitions. The system may be configured to generate subqueries for each identified table definition using the select instruction to create a flat/aggregated view on individual database tables and allow for joining together without creating a Cartesian product in the case of a one to many relationship. The system may be configured to join generated subqueries together to form a single database query and selecting all requested columns. The generated database query may be executable to return results of the query.

In one example, the subquery does not contain any calculations when selecting columns. For a subquery corresponding to a column definition with a calculated field, a relational database expression (e.g., SQL expression) may be generated. The system may be configured to generate subqueries for each table which is related to the root table via a one to many or relationship.

A subquery generator component of the query generation component may be configured to traverse the relationship graph as defined by the table relationships, which may be in order to create a join between each table from the root table through to the table for which the sub query is being generated. The subquery generation component may be configured to select columns which are members of the table for which the sub query is being generated. The subquery generation component may be configured to select the primary key of the root table in order to facilitate joining the subquery to the root table. The subquery generation component may be configured to select columns using their respective aggregation method as defined in the column definitions.

When defining a calculated column, the formula expression may refer to other column definitions using their unique name. When generating the expression for a calculated column, the formula may first be expanded by replacing references to other calculated columns with their formulas in a recursive manner until all column references are references to database fields rather than calculated columns. Subqueries may be implemented as common table expressions.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system, comprising:
a processing system; and
a memory device coupled to the processing system and including instructions stored thereon that, in response to execution by the processing system:
receive configuration data that includes a mapping of objects of a relational database to query generation parameters, the mapping includes column definitions, table definitions, and table relationships for at least a portion of the relational database;
compare values in a received first query to a configuration data database to the mapping to identify column definition data of the query generation parameters;
ascertain whether to identify table definition data of the configuration data based on the column definition data;
determine whether to create one or more subqueries for one or more tables based on the table definition data;
in response to determining to create the one or more subqueries, join a table of the one or more tables to a root table based on table relationship data of the configuration data;
build a second query for the relational database using the one or more subqueries, wherein to execute the second query is to produce a flattened view of data across the one or more tables in the relational database; and
perform at least one of execute the second query or store the second query in an electronic device, wherein the configuration data database and the relational database are different databases.

2. The database system of claim 1, wherein the determination includes: filter a set of tables based on the table definition data to select a subset of the set of tables, wherein the subset comprises one of the one or more tables, and each table of the subset of the table relationship data corresponds to a one to many relationship.

3. The database system of claim 1, wherein the root table includes a single row including information corresponding to the joined table.

4. The database system of claim 3, wherein the one or more subqueries is based on more than one row of the joined table and the single row of the root table.

5. The database system of claim 1, wherein the first query comprises an instruction to select data of the relational database.

6. The database system of claim 5, wherein the first query identifies objects of a second relational database, and wherein each of said values corresponds to a different one of the objects of the second relational database.

7. The database system of claim 6, wherein the objects comprises columns.

8. The database system of claim 7, wherein the values specify a calculated column based on more than one of the columns, and wherein the processing system identifies an aggregation function from the identified column definition data.

9. The database system of claim 8, wherein the instructions are further operable to:
compare said values to the mapping to identify the column definitions.

10. The database system of claim 7, wherein the instructions are further operable to:
look up the table definitions from the configuration data responsive to the identification of the column definitions.

11. A method of automatically compiling a relational datastore query in response to receipt of a user input, the method comprising:
comparing values in the user input to configuration data in a configuration data database that includes to identify a portion of column definition data and table relationship data of the configuration data, the configuration data includes a mapping of objects of the datastore to query generation parameters, the mapping includes column definitions, table definitions, and table relationships for at least a portion of the datastore;
ascertaining whether to identify table definition data of the configuration data based on information from the identified column definition data;
determining whether to create one or more subqueries for one or more tables based on the table definition data;
in response to determining to create the one or more subqueries, joining a table of the one or more tables to a root table based on table relationship data of the configuration data;
building the relational datastore query for a relational database using the one or more subqueries; and
performing at least one of execute the relational datastore query or store the relational datastore query in an electronic device, wherein the configuration data database and the relational database are different databases, and to execute the relational datastore query is to produce a flattened view of data across the one or more tables in the datastore.

12. The method of claim 11, wherein the column definition data is for expressly selected columns of the user input.

13. The method of claim 12, wherein the table relationship data defines a relationship between tables of said selected columns.

14. The method of claim 11, wherein the one or more subqueries comprise common table expressions.

15. The method of claim 11, wherein the root table includes a single row including information corresponding to the joined table.

16. The method of claim 15, wherein a subquery of the one or more subqueries is based on more than one row of the joined table and the single row of the root table.

17. The method of claim 11, wherein a first subquery of the one or more subqueries is created in parallel with creation of a second subquery of the one or more subqueries.

18. The method of claim 11, wherein each subquery of the one or more subqueries is created responsive to joining a respective table of the one or more tables to a root table based on the table relationship data of the configuration data.

19. The method of claim 11, wherein the datastore comprises a multi-tenant database system (MTS).

20. The method of claim 11, wherein the user input is received at an electronic device over a network, and wherein the comparing, ascertaining, determining, joining, building, and performing are programmatically and automatically executed by a processor of the electronic device without requiring additional user input.

\* \* \* \* \*